US012701031B2

(12) United States Patent
Pandey

(10) Patent No.: US 12,701,031 B2
(45) Date of Patent: Aug. 4, 2026

(54) COMMUNICATION INTERFACE AND METHOD FOR SEAMLESS ASYMMETRIC COMMUNICATION OVER MULTILANE COMMUNICATION LINK

(71) Applicant: HUAWEI TECHNOLOGIES CO., LTD., Shenzhen (CN)

(72) Inventor: Sujan Pandey, Leuven (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 18/525,330

(22) Filed: Nov. 30, 2023

(65) Prior Publication Data

US 2024/0097936 A1 Mar. 21, 2024

Related U.S. Application Data

(63) Continuation of application No. PCT/EP2021/074555, filed on Sep. 7, 2021.

(51) Int. Cl.
*H04L 12/40* (2006.01)
*H04L 12/46* (2006.01)
(52) U.S. Cl.
CPC .... *H04L 12/40182* (2013.01); *H04L 12/4645* (2013.01)
(58) Field of Classification Search
None
See application file for complete search history.

(56) References Cited

U.S. PATENT DOCUMENTS

| | | | | |
|---|---|---|---|---|
| 11,601,999 | B2 * | 3/2023 | Chu | H04W 48/12 |
| 2003/0039250 | A1 * | 2/2003 | Nichols | H04L 47/125 |
| | | | | 370/476 |
| 2010/0162033 | A1 | 6/2010 | Ahn et al. | |
| 2012/0066531 | A1 | 3/2012 | Shafai et al. | |

(Continued)

FOREIGN PATENT DOCUMENTS

WO 2017134419 A1 8/2017

OTHER PUBLICATIONS

"IEEE Standard for Ethernet, Amendment 8: Physical Layer Specifications and Management Parameters for 2.5 Gb/s, 5 Gb/s, and 10 Gb/s Automotive Electrical Ethernet," IEEE Std 802.3ch, IEEE Computer Society, Total 207 pages, Institute of Electrical Electronics Engineers, New York, New York (Jun. 30, 2020).

(Continued)

*Primary Examiner* — Brian S Roberts
(74) *Attorney, Agent, or Firm* — Leydig, Voit & Mayer, Ltd.

(57) ABSTRACT

A communication interface is used at a first end of a communication link and includes a number of communication lanes. The communication interface includes a logic configured to cooperate with another communication interface at a second end of the communication link to send data to the second end over the communication lanes. The logic is configured to store a communication lane status for an awake communication lane, and upon detecting that the communication lane status for the awake communication lane is changed to a first determined status: to stop sending data over the awake communication lane, change an asleep communication lane into a new awake communication lane, and inform the communication interface at the second end.

17 Claims, 6 Drawing Sheets

(56) References Cited

U.S. PATENT DOCUMENTS

| | | | |
|---|---|---|---|
| 2013/0329546 A1* | 12/2013 | Wijnands ............ | H04L 12/1863 |
| | | | 370/244 |
| 2018/0206190 A1* | 7/2018 | Cherian ................ | H04L 1/1621 |
| 2020/0186560 A1* | 6/2020 | Ben-Noon ............ | H04L 63/123 |
| 2021/0289442 A1* | 9/2021 | Naribole ........... | H04W 52/0235 |

OTHER PUBLICATIONS

Kono et al.,"A 400-Gb/s and Low-Power Physical-Layer Architecture for Next-Generation Ethernet," ICC 2011, IEEE International Conference on Communications, XP031908504, Total 6 pages, Institute of Electrical Electronics Engineers, New York, New York (Jun. 5, 2011).

* cited by examiner

STORING, AT FIRST END, COMMUNICATION LANE STATUS FOR SAID AWAKE COMMUNICATION LANE
402

DETECTING, AT FIRST END, THAT COMMUNICATION LANE STATUS FOR SAID AWAKE COMMUNICATION LANE HAS CHANGED TO FIRST DETERMINED STATUS, AND WHEN DETECTING, AT FIRST END, THAT COMMUNICATION LANE STATUS FOR SAID AWAKE COMMUNICATION LANE HAS CHANGED TO DETERMINED STATUS
404

STOPPING SENDING DATA OVER AWAKE COMMUNICATION LANE
406

CHANGING ASLEEP COMMUNICATION LANE INTO NEW AWAKE COMMUNICATION LANE
408

INFORMING OTHER COMMUNICATION INTERFACE AT SECOND END THAT NEW AWAKE COMMUNICATION LANE WILL BE USED TO SEND DATA
410

SENDNIG DATA TO SECOND END OVER NEW AWAKE COMMUNICATION LANE
412

FIG. 4

COMMUNICATION INTERFACE AND METHOD FOR SEAMLESS ASYMMETRIC COMMUNICATION OVER MULTILANE COMMUNICATION LINK

CROSS-REFERENCE TO RELATED APPLICATIONS

This application is a continuation of International Application No. PCT/EP2021/074555, filed on Sep. 7, 2021, the disclosure of which is hereby incorporated by reference in its entirety.

FIELD

The present disclosure relates generally to the field of data communication and more specifically, to a communication interface for use at both ends of a communication link, a communication network including the communication interface, and a method of seamless data communication over a multilane communication link.

BACKGROUND

Generally, autonomous vehicles require a high-speed (e.g., multi-gigabit) data communication link in order to transfer data from various sensors (e.g., camera1, camera2, RADAR, and the like) to a central processing unit (CPU). Typically, an in-vehicle network is used to communicate data among various sensors (or nodes) and from the sensors to the CPU. Conventionally, a high-speed automotive Ethernet standard is used for the multi-gigabit data communication among the sensors as well as from the sensors to the CPU. The conventional high-speed automotive Ethernet standard employs a single twisted pair cable. However, the single twisted pair cable has its own physical limit with respect to bandwidth. By virtue of the physical limit of the single twisted pair cable, the single twisted pair cable is preferably not used for the multi-gigabit data communication. The multi-gigabit data communication deals with a high data rate that is beyond 25 gigabits per second (Gbit/s). Therefore, there is a requirement for multilane technology that can deliver multiples of gigabit as a backbone for communication with the autonomous vehicles. In the autonomous vehicles, the multilane technology (or the multi-gigabit communication technology) is related to safety. If any one lane of the multilane technology is broken then, entire communication link will stop working. Moreover, the lane failure may further result in undesirable consequences. In the typical in-vehicle network, multiple cables are used in order to connect various sensors with each other as well as to the CPU. The use of the multiple cables results in cable congestion, and also, the cables contribute a quite some portion of the total weight of the typical autonomous vehicle. Therefore, in order to reduce the cable congestion, multiple sensors are aggregated in a typical switch. A multi-gigabit communication link is established between various typical switches, which acts as a backbone of the typical in-vehicle network communication. In one case, if any one lane of the multi-gigabit communication link is turned into a failure, then, in such a case, there will be no communication at all.

Currently, certain attempts have been made in order to maintain the communication between various typical switches in case of a lane failure, such as a conventional method is based on using huge buffers on a physical (PHY) layer(s). However, the conventional method results in an additional latency to the overall communication. Furthermore, the conventional method describes that the coding is done and the received data is aligned at the receiver, but the method does not provide any detail on how the coding is done without affecting the hardware and performance. Thus, a communication link drop in case of any lane failure, resulting in no communication or a flawed and unreliable communication between various typical switches of the typical in-vehicle network. Therefore, there exists a technical problem of how to perform a seamless transmission of data between various typical switches of the typical in-vehicle network during link failure and without affecting the overall performance of the typical in-vehicle network.

Therefore, in light of the foregoing discussion, there exists a need to overcome the aforementioned drawbacks associated with the conventional communication link.

SUMMARY

The present disclosure provides a communication interface for use at both ends of a communication link. The present disclosure further provides a communication network with the communication interface and a method of seamless data communication over a multilane communication link. The present disclosure provides a solution to the existing problem of how to perform a seamless transmission of data between various typical switches of the typical in-vehicle network during link failure and without affecting an overall performance of the typical in-vehicle network. The present disclosure provides a solution that overcomes at least partially the problems encountered in the prior art and provides an improved communication interface that provides seamless data communication at both ends of a communication link, even in case of a lane failure. The present disclosure further provides a communication network with an improved communication interface that manifests a flawless and reliable communication, even in case of a lane failure, and a method of seamless data communication over a multilane communication link.

In one aspect, the present disclosure provides a communication interface for use at a first end of a communication link comprising a number of communication lanes greater or equal to two. The communication interface further comprises a logic configured to cooperate with other communication interface at a second end of the communication link to send data to the second end over one awake communication lane amongst the said communication lanes. At least one asleep communication lane amongst the said communication lanes being in a sleep mode in which it cannot send any data, the logic is further configured to: store a communication lane status for the said awake communication lane, and when detecting that the communication lane status for the said awake communication lane has changed to a first determined status. The logic is further configured to stop sending data over the awake communication lane, change the asleep communication lane into a new awake communication lane, inform the communication interface at the second end that the new awake communication lane will be used to send data, and send data to the second end over the new awake communication lane.

The disclosed communication interface provides seamless data communication between the first end and the second end of the communication link, even in case of a lane failure. Additionally, the logic at the communication interface is configured for early detection of the first determined status of a communication lane amongst the said communication lanes and accordingly communicate each of the communication interfaces at the first end and the second end of the communication link about the communication lane with the first determined status and maintain the data communication seamlessly by use of the other communication lanes. The communication interface at the first end is configured to transmit the data to the other communication interface at the second end with a full data rate and with an improved bandwidth by making all the communication lanes in an operation mode. Moreover, the other communication interface at the second end is configured to transmit the data to the communication interface at the first end with a low data rate, and hence, there is no need to operate all the communication lanes simultaneously. Instead, merely one communication lane is sufficient to transmit the data from the second end resulting in reduced power consumption and more energy efficiency. Therefore, one communication lane is used as the awake communication lane, and remaining communication lanes are configured to stay in sleep mode in order to save energy. If the awake communication lane turned in a lane failure, then one of the communication lanes which are set in sleep mode is changed into the new awake communication lane for data communication. Thus, there will be a seamless transmission of data from the communication interface to the other communication interface. Moreover, as long as there exists at least one awake communication lane (i.e., one fault-free communication lane), the transmission of data takes place seamlessly between the first end to the second end.

In an implementation form, the communication interface further comprises, for each given communication lane amongst all the awake communication lanes and all the asleep communication lanes, a buffer configured to receive data to be transmitted, over the given communication lane, to a corresponding buffer in the communication interface at the second end, and a gate configured to open or close the input in the buffer of data to be transmitted over the given communication lane, to the corresponding buffer in the communication interface at the second end, the logic being configured to control the gate depending on the communication lane status of the given communication lane.

By virtue of using the buffer and the gate corresponding to each communication lane, a reliable and high-speed data communication is obtained between both ends of the communication link.

In a further implementation form, the buffer is configured to receive data transmitted over the given communication lane from the corresponding buffer in the other communication interface at the second end, and the gate is configured to open or close the output of data received over the given communication lane, the logic being configured to control the gate depending on the communication lane status of the given communication lane.

In a further implementation form, the logic is further configured to split a data frame into a number of subframes corresponding to the number of awake communication lanes, the data to be transmitted over the awake communication lanes being one of said subframes.

By virtue of splitting the data frame into the number of subframes, a high-speed data communication can be obtained.

In a further implementation form, the data to be transmitted over the awake communication lanes is a control message containing a control information to be used for controlling the working of a device located at the second end and connected to the other communication interface at said second end.

By virtue of using the control message, the device located at the second end can be configured either for maintenance or repair mode.

In a further implementation form, the logic is further configured, when detecting that the communication lane status for the said awake communication lane has changed to a second determined status, to change the asleep communication lane into a new awake communication lane, inform the communication interface at the second end that the new awake communication lane will be used to send data, send data to the second end over the awake communication lane and over the new awake communication lane.

By virtue of sending the data to the second end over the awake communication lane and over the new awake communication lane, there will be a seamless data transmission from the communication interface to the other communication interface.

In another aspect, the present disclosure provides a communication network comprising a first node at a first end of a communication link and second node at a second end of the communication link, said communication link comprising a number of communication lanes greater or equal to two, the first and the second nodes each comprising the communication interface.

The communication network provides a seamless data communication between the first node and the second node, even in case of a lane failure of the number of the lanes of the communication link between the first node and the second node. The seamless data communication is obtained by virtue of comprising the disclosed communication interface at each of the first node and the second node.

In an implementation form, the communication network is an in-vehicle communication network.

The in-vehicle communication network manifests multi-gigabit communication as well as seamless data communication in spite of a lane failure.

In yet another aspect, the present disclosure provides a method of communication over a communication link comprising a number of communication lanes greater or equal to two and having a first end and a second end. The method comprises sending data from the first end to second end over one awake communication lane amongst the said communication lanes, at least one asleep communication lane amongst the said communication lanes being in a sleep mode in which it cannot send any data. The method further comprising: storing, at the first end, a communication lane status for the said awake communication lane, and detecting, at the first end, that the communication lane status for the said awake communication lane has changed to a first determined status, and when detecting, at the first end, that the communication lane status for the said awake communication lane has changed to the determined status: stopping sending data over the awake communication lane, changing the asleep communication lane into a new awake communication lane, informing the other communication interface at the second end that the new awake communication lane will be used to send data, sending data to the second end over the new awake communication lane.

The method achieves all the advantages and technical effects of the communication interface of the present disclosure.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 4 is a flowchart of a method of communication over a communication link comprising a number of communication lanes, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
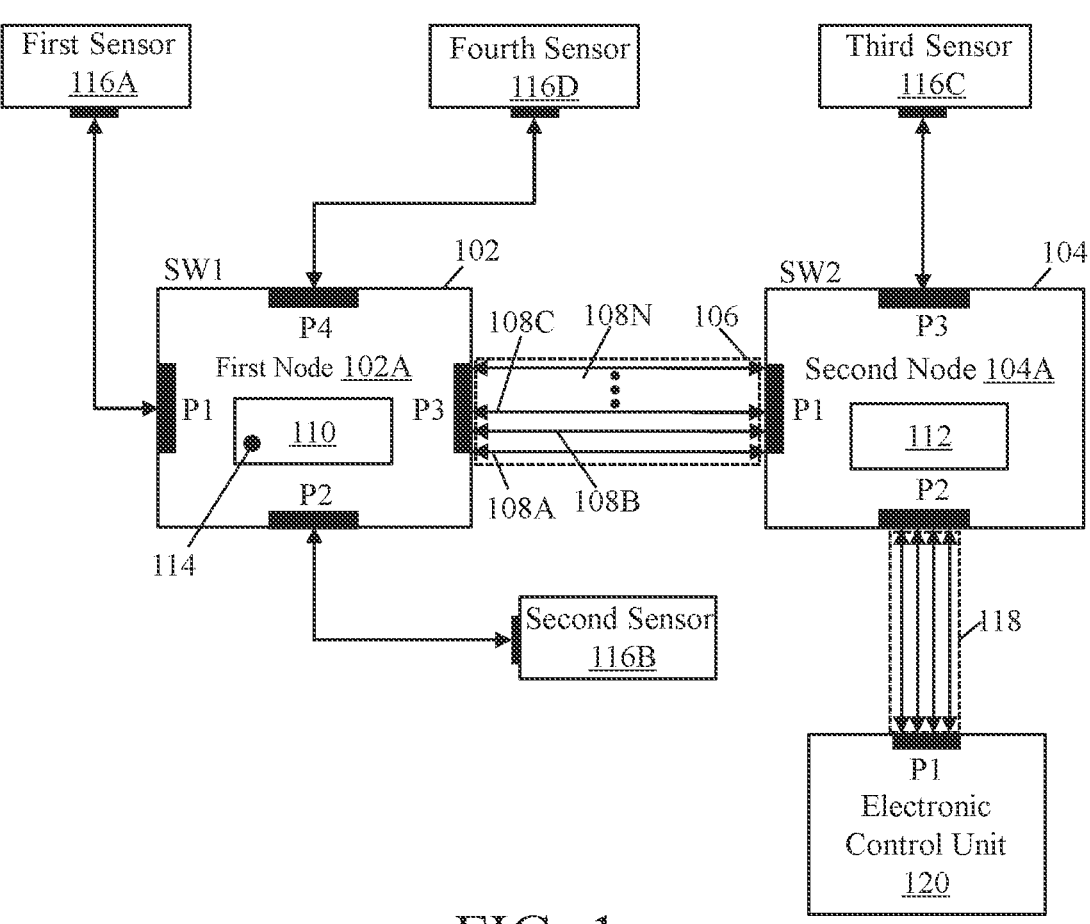
FIG. 1 is a network diagram that illustrates seamless data communication between a first node placed at a first end of a communication link and a second node placed at a second end of the communication link, in accordance with an embodiment of the present disclosure.

FIG. 1 is a network diagram that illustrates seamless data communication between a first node placed at a first end of a communication link and a second node placed at a second end of the communication link, in accordance with an embodiment of the present disclosure. With reference to FIG. 1, there is shown a communication network 100 that includes a first node 102A and a second node 104A. The first node 102A is located at a first end 102 of a communication link 106, and the second node 104A is located at a second end 104 of the communication link 106. The communication link 106 includes a number of communication lanes 108A-108N, which is either greater or equal to two in number. The first node 102A includes a communication interface 110 and the second node 104A includes another communication interface 112. There is further shown a logic 114, a plurality of sensors, such as a first sensor 116A, a second sensor 116B, a third sensor 116C, and a fourth sensor 116D, connected to the first node 102A and the second node 104A. Furthermore, there is a communication link 118 between the second node 104A and an electronic control unit 120.

The communication network 100 provides a seamless data communication between the first node 102A and the second node 104A. The communication network 100 maintains the communication between the first node 102A and the second node 104A, even in case of a lane failure of the number of the communication lanes 108A-108N of the communication link 106. Conventionally, if any one lane of the number of lanes is turned into a failure, then there was no communication among typical nodes of a typical communication network. In spite of the lane failure, the communication network 100 of the present disclosure provides a communication between the first node 102A and the second node 104A with an improved bandwidth. In an implementation, the communication network 100 is an in-vehicle communication network. The communication network 100 includes a medium (either wired or wireless or optical) through which the various control units, or components, such as the first node 102A with the communication interface 110, the second node 104A with the other communication interface 112, the plurality of sensors, the electronic control unit 120 communicate with each other. Examples of the wired and wireless communication protocols for the communication network 100 may include, but are not limited to, a vehicle area network (VAN), a CAN bus, Domestic Digital Bus (D2B), Time-Triggered Protocol (TTP), FlexRay, IEEE 1394, Inter-Integrated Circuit (I2C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

Each of the first node 102A and the second node 104A corresponds to a switch. For example, the first node 102A may also be referred to as a first switch (also represented as SW1), and the second node 104A may also be referred to as a second switch (also represented as SW2). Anther examples of the first node 102A and the second node 104A may include but are not limited to a router, a transmitter, a receiver, a transmitting device, a receiving device, a transceiver, and the like.

Each of the first node 102A and the second node 104A are located at the first end 102 and the second end 104 of the communication link 106, respectively. The communication link 106 is a full-duplex link. This means that each of the first node 102A and the second node 104A can be configured for simultaneously transmitting and receiving data over the communication link 106. Moreover, the communication link 106 between the first node 102A and the second node 104A can be either wired or wireless, or optical in nature, depending on a use case. The communication link 106 between the first node 102A and the second node 104A is a multilane communication link, hence, the communication link 106 can provide a data rate of either 25 Giga(G)bits/s, 50 Gbits/s, 100 Gbits/s or beyond 100 Gbits/s. In the communication network 100, the communication link 106 includes N-number of communication lanes 108A-108N. Moreover, the communication network 100 provides a data rate of 100 Gbits/s over the communication link 106. However, in another implementation, the number of communication lanes 108A-108N may range up to N number of lanes. Examples of the communication link 106 may include, but are not limited to, a Wireless Fidelity (Wi-Fi) communication link, a Local Area Network (LAN) communication link, a wireless personal area network (WPAN) communication link, a Wireless Local Area Network (WLAN) communication link, a wireless wide area network (WWAN) communication link, a cloud network communication link, a Long-Term Evolution (LTE) network communication link, a Metropolitan Area Network (MAN) communication link, and/or the Internet.

The first node 102A and the second node 104A include the communication interface 110 and the other communication interface 112, respectively. The communication interface 110 at the first node 102A is configured to cooperate with the other communication interface 112 at the second node 104A in order to send a data frame over the communication link 106, described in detail, for example, in FIG. 2A. Examples of each of the communication interface 110 and the other communication interface 112 may include, but are not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card.

The communication interface 110 includes the logic 114 that is configured to cooperate with the other communication interface 112 at a second end 104 of the communication link 106. In an example, the logic 114 corresponds to a combination of a transcoder and a de-multiplexer. Examples of the logic 114 may include, but are not limited to, a microcontroller, a microprocessor, a central processing unit (CPU), a complex instruction set computing (CISC) processor, an application-specific integrated circuit (ASIC) processor, a reduced instruction set (RISC) processor, a very long instruction word (VLIW) processor, a data processing unit, and other processors or control circuitry.

In the communication network 100, each of the first sensor 116A, the second sensor 116B, and the fourth sensor 116D is connected to the first node 102A, and the third sensor 116C is connected to the second node 104A. Each of the first sensor 116A, the second sensor 116B, the third sensor 116C, and the fourth sensor 116D is connected at physical layer(s) of the first node 102A and the second node 104A. For example, each of the first sensor 116A, the second sensor 116B, and the fourth sensor 116D is connected at physical layers (represented by P1, P2, and P4, respectively) of the first node 102A, and each connection provides a data rate of 25 Gbits/s. Similarly, the third sensor 116C is connected at the physical layer (also represented by P3) of the second node 104A and provides a data rate of 25 Gbits/s. The first node 102A and the second node 104A are connected with each other through the communication link 106 between physical layers (P3, P1) of the first node 102A and the second node 104A, respectively. Examples of each of the first sensor 116A, the second sensor 116B, the third sensor 116C, and the fourth sensor 116D may include, but are not limited to, a camera, radio detection and ranging (RADAR), light detection, and ranging (LiDAR), global navigation satellite system (GNSS) receiver, dash-cam, and the like.

The communication link 118 between the second node 104A and the electronic control unit 120 corresponds to the communication link 106 between the first node 102A and the second node 104A. The electronic control unit 120 includes suitable logic, circuitry, interfaces, and/or code that is configured to monitor and optimize the performance of the plurality of sensors depending on the data received from the first node 102A and the second node 104A.

In one aspect, the present disclosure provides a communication network 100 comprising a first node 102A at a first end 102 of a communication link 106 and second node 104A at a second end 104 of the communication link 106, said communication link 106 comprising a number of communication lanes 108A-108N greater or equal to two, the first end 102 and the second node 104A each comprising the communication interface 110. The communication network 100 provides a seamless data communication between the first node 102A and the second node 104A. The communication network 100 maintains the seamless data communication between the first node 102A and the second node 104A, even in case of a lane failure of the number of the communication lanes 108A-108N of the communication link 106. In spite of the lane failure, the communication network 100 provides the seamless data communication between the first node 102A and the second node 104A at a partially reduced data rate in the asymmetric mode of communication in the multilane system.

In accordance with an embodiment, the said communication network 100 is an in-vehicle communication network. Therefore, the communication network 100 is useful for communication between various switches of the in-vehicle network. The in-vehicle communication network manifests multi-gigabit communication as well as seamless data communication in spite of a lane failure.

Figure 2A:
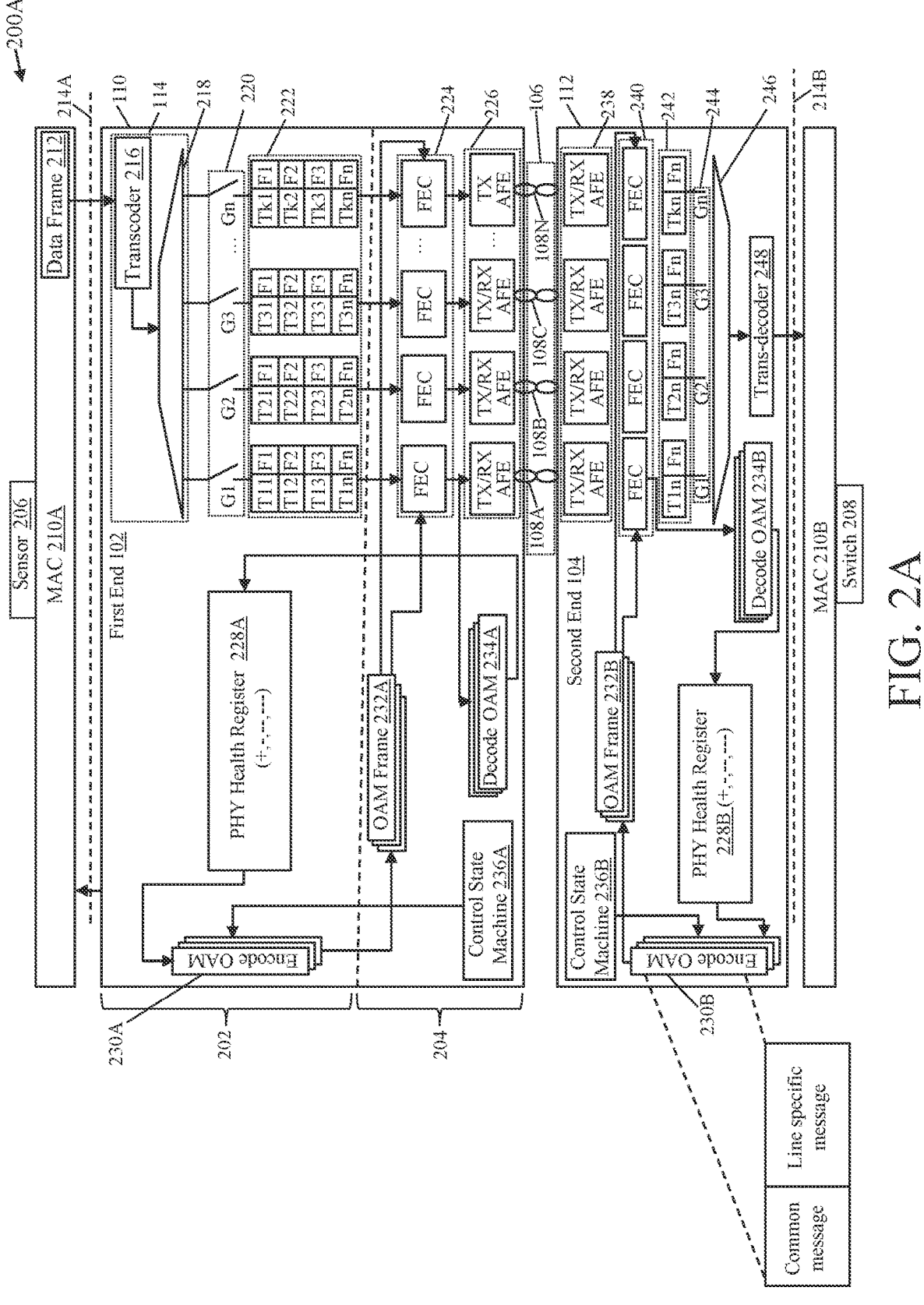
FIG. 2A illustrates communication between various sub-blocks associated with communication interfaces of a first end and a second end, in accordance with an embodiment of the present disclosure.

FIG. 2A illustrates communication between various sub-blocks associated with communication interfaces of a first end and a second end, in accordance with an embodiment of the present disclosure. FIG. 2A is described in conjunction with elements from FIG. 1. With reference to FIG. 2A, there is shown a circuit architecture 200A that illustrates communication between various sub-blocks associated with the communication interface 110 of the first node 102A and the other communication interface 112 of the second node 104A of the communication network 100 (of FIG. 1). The circuit architecture 200A illustrates that the communication interface 110 is configured for use at the first end 102 of the communication link 106, and the other communication interface 112 is configured for use at the second end 104 of the communication link 106. The communication link 106 includes N-number of communication lanes 108A-108N. There is further shown a sensor 206, a switch 208, a medium access control (MAC) layer 210A, a data frame 212, a medium independent interface (MII) layer 214A, another medium access control (MAC) layer 210B, and another medium independent interface (MII) layer 214B.

The communication interface 110 includes a physical coding sublayer (PCS) 202 and a physical medium attachment (PMA) 204. The PCS 202 at the communication interface 110 includes a transcoder 216, a de-multiplexer 218 with a number of gates 220 (also represented as $G_1$, $G_2$, $G_3$, . . . , $G_n$), number of buffers 222, and an encode operation, administration, and management (OAM) block 230A. There is further shown a physical health register 228A, which is accessible to both the PCS 202 and the PMA 204. The PMA 204 at the communication interface 110 includes a number of forward error correction (FEC) blocks 224, a number of transmitter/receivers analog front ends (TX/RX-AFE) 226, an OAM frame 232A, a decode OAM block 234A, and a control state machine 236A.

Similarly, the other communication interface 112 also includes a physical coding sublayer (not shown in FIG. 2A), and a physical medium attachment (not shown in FIG. 2A). The other communication interface 112 includes a physical health register 228B, which is accessible to both the PCS and the PMA of the other communication interface 112. There is further shown an encode OAM block 230A, an OAM frame 232B, a decode OAM block 234B, and a control state machine 236B. The other communication interface 112 further includes a number of transmitter/receivers analog front ends (TX/RX-AFE) 238, a number of forward error correction (FEC) blocks 240, a number of buffers 242, a number of gates 244, a multiplexer 246, and a trans-decoder 248.

Each of the number of gates 220, the number of buffers 222 at the PCS 202 of the communication interface 110 and the number of gates 244, the number of buffers 242 at the PCS of the other communication interface 112 are represented by a dashed box, which is used for illustration purpose only and does not form a part of the circuitry. Similarly, each of the number of FEC blocks 224, the number of TX/RX-AFE 226 at the PMA 204 of the communication interface 110, and the number of TX/RX-AFE 238, and the number of FEC blocks 240, at the PMA of the other communication interface 112 are also represented by a dashed box, which is used for illustration purpose only, and does not form a part of the circuitry.

As shown in FIG. 2A, the sensor 206 is configured to send the data to the switch 208, which is also referred to as an up-link communication of the data. The data communication from the sensor 206 to the switch 208 requires a full data rate given the high bandwidth requirement. Therefore, each of the number of communication lanes 108A-108N is used as an awake communication lane. Moreover, each of the number of TX/RX-AFE 226 of the communication interface 110 and the number of TX/RX-AFE 238 of the other communication interface 112 can be used as a transmitter as well as a receiver depending on a use case. Therefore, each of the communication interface 110 and the other communication interface 112 can be configured to function as a transmitter as well as a receiver or, better to say, as a transceiver. Hence, the communication interface 110 (or a transceiver) is able to transmit the data frame 212 to the other communication interface 112 as well as receive the data frame 212 (or any other data frame) from the other communication interface 112.

The present disclosure provides the communication interface 110 for use at the first end 102 of the communication link 106 comprising the number of communication lanes 108A-108N greater or equal to two. The communication interface 110 comprises the logic 114 configured to cooperate with the other communication interface 112 at the second end 104 of the communication link 106 to send data to the second end 104 over one awake communication lane amongst the said communication lanes 108A-108N. The communication interface 110 further comprises at least one asleep communication lane amongst the said communication lanes 108A-108N being in a sleep mode in which it cannot send any data. In other words, the communication link 106 includes the first end 102 and the second end 104, such as the communication interface 110 is arranged at the first end 102, and the other communication interface 112 is arranged at the second end 104 of the communication link 106. The communication link 106 includes the number of communication lanes 108A-108N that are used to send the data from the first end 102 to the second end 104, and vice versa. In an implementation, the first end 102 of the communication link 106 is configured to receive the data in form of the data frame 212 from the sensor 206 through the MAC layer 210A. Thereafter, the data frame 212 is received by the logic 114 of the communication interface 110. The logic 114 is configured to cooperate with the other communication interface 112 so that the logic 114 can send the data frame 212 to the second end 104 and over the one awake communication lane amongst the said communication lanes 108A-108N. For example, if the communication lane 108A is an awake communication lane, and the communication lanes 108B-108N are asleep communication lanes, then the logic 114 sends the data to the second end 104 over the communication lane 108A. As the communication link 106 includes one awake communication lane. Thus, there will be a seamless transmission of data from the communication interface 110 to the other communication interface 112. Moreover, the communication link 106 is useful to send the data from the first end 102 to the second end 104 with a full data rate and with an improved bandwidth. In an example, the communication lane 108B is one asleep communication lane. In another example, there exists more than one asleep communication lanes, such as the communication lanes 108B, 108C, and other subsequent communication lanes up to 108N are the asleep communication lanes. Alternatively stated, the at least one asleep communication lane amongst the communication lanes 108B-108N is in the sleep mode (i.e., which cannot send any data). Therefore, in another implementation, the communication link 106 can also send the data from the second end 104 to the first end 102 with a low data rate because there is no need to operate all the communication lanes 108A-108N. Instead, just one communication lane (e.g., the communication lane 108A) is sufficient, which reduces overall power consumption. In the circuit architecture 200A, data transfer from the sensor 206 to the switch 208 is depicted, and corresponding sub blocks of physical layers (e.g., P1, P2, and P4) are also enabled to facilitate full data rate.

The logic 114 being further configured to store a communication lane status for the said awake communication lane, and when detecting that the communication lane status for the said awake communication lane has changed to a first determined status. The logic 114 is further configured to stop sending data over the awake communication lane and change the asleep communication lane into a new awake communication lane. The logic 114 is further configured to inform the other communication interface 112 at the second end 104 that the new awake communication lane will be used to send data and send data to the second end over the new awake communication lane. In an implementation, the communication lane 108A acts as an awake communication lane (or active), and the communication lanes 108B-108N acts as asleep communication lanes (or inactive). Moreover, the logic 114 is configured to store the communication lane status for the said awake communication lane, such as communication lane 108A. In an example, the communication lane status corresponds to communication lane health and availability of the awake communication lane. Thus, if the communication lane status for the communication lane 108A is changed to the first determined status, as further shown and described in detail, for example, in FIG. 2C. Then, the first determined status will be detected by the logic 114. Therefore, the logic 114 of the communication interface 110 is beneficial for an early detection of the first determined status of the communication lane 108A. In an example, the first determined status represents an error in signal to noise ratio, error in bit error rate, and also the unknown status of supply voltage, of local/remote communication link status, as well as of loopback mode tests. In an example, the first determined status is represented via a '--' symbol in the physical health register 228A. Thereafter, the first determined status (e.g., '--') of the communication lane 108A is shared with the other communication interface 112 of the second end 104. Moreover, if both the communication interface 110 and the other communication interface 112 agree that the communication link status of the communication lane 108A is changed to the first determined status. Then the logic 114 of the communication interface 110 is configured to not to send the data over the communication lane 108A. The logic 114 is further configured to change the communication lane 108B from the asleep communication lane to the new awake communication lane. After that, the logic 114 informs the other communication interface 112 that the new awake communication lane (i.e., communication lane 108B) will be used to send data from the first end 102 to the second end 104.

The logic 114 is further configured to send the data from the first end 102 to the second end 104 over the new awake communication lane, such as over the communication lane 108B. Therefore, the logic 114 of the communication interface 110 allows seamless communication of the data from the first end 102 to the second end 104 in case of a lane failure.

In an implementation, the logic 114 is further configured to store the communication lane status of the communication lane 108B. For example, if the communication lane status of the communication lane 108B is changed to the first determined status. Then, the logic 114 of the communication interface 110 is configured to not to send the data over the communication lane 108B. Moreover, the logic 114 is further configured to change the communication lane 108C from the asleep communication lane to the new awake communication lane. Thereafter, the communication lane status of the new awake communication lane (i.e., the communication lane 108C) is informed to the other communication interface 112 at the second end 104 that the communication lane 108C will be used to send data from the first end 102 to the second end 104. Finally, the logic 114 is configured to send the data from the first end 102 to the second end 104 over the new awake communication lane, such as over the communication lane 108C. Thus, as soon as the first determined status is detected for the awake communication lane, the logic 114 of the communication interface 110 will detect the first determined status and takes action accordingly. Beneficially, as long as there exists at least one awake communication lane (i.e., one fault-free communication lane), the transmission of data takes place seamlessly between the first node 102A of the first end 102 to the second node 104A of the second end 104.

In accordance with an embodiment, the logic 114 is further configured to split a data frame 212 into a number of subframes corresponding to the number of awake communication lanes, the data to be transmitted over the awake communication lanes being one of said number of subframes. In an example, the logic 114 includes the transcoder 216, and the de-multiplexer 218. Moreover, the transcoder 216 is configured to receive the data frame 212 from the sensor 206. The transcoder 216 is configured to receive the data frame 212 through the MAC layer 210A and the medium independent interface layer 214A. Thereafter, the transcoder 216 passes the data frame 212 to the de-multiplexer 218, which is configured to split the data frame 212 into the number of subframes that corresponds to the number of awake communication lanes amongst the said communication lanes. For example, in the circuit architecture 200A, each of the number of communication lanes 108A-108N is used, therefore, the data frame 212 is splitted to N number of subframes (e.g., F1 to Fn). Thereafter, each of the number of communication lanes 108A-108N is configured to transmit the N number of subframes (i.e., F1 to Fn) from the first end 102 to the second end 104. By virtue of using the number of subframes, a high-speed communication can be obtained.

In accordance with an embodiment, the communication interface 110 further comprises, for each given communication lane amongst all the awake communication lanes and all the asleep communication lanes, a buffer configured to receive data to be transmitted, over the given communication lane, to a corresponding buffer in the other communication interface 112 at the second end 104. The communication interface 110 further comprises a gate configured to open or close the input in the buffer of data to be transmitted over the given communication lane to the corresponding buffer in the other communication interface 112 at the second end 104. The logic 114 is configured to control the gate depending on the communication lane status of the given communication lane. In an implementation, the transcoder 216 receives the data frame 212 from the MAC layer 210A, where the data frame 212 includes fixed size of data. Thereafter, the transcoder 216 adds first few bits in the data frame 212 for control purpose and depending on the communication lane status of the given communication lane (i.e., availability and the functioning number of the communication lanes). Thereafter, the de-multiplexer 218 of the logic 114 is configured to split the data frame 212 into the number of subframes, which are further received by the number of buffers 222 through the number of gates 220. In an example, the number of subframes is equal to the number of gates 220, such as for N-number gates (i.e., G1 to Gn), there exits N-number of subframes (i.e., F1 to Fn). The number of gates 220 are further controlled by the logic 114 based on the communication lane status of each communication lane 108A-108N. For example, if the communication lane status shows that all the communication lanes 108A-108N are the awake communication lane. Then, the logic 114 is configured to open the number of gates 220 corresponds to each communication lane 108A-108N, so that the corresponding buffers from the number of buffers 222 can receive the number of subframes. However, in another implementation, if the communication lane status shows that only the communication lane 108A is the awake communication lane, and the communication lane 108B is the asleep communication lane. Then, the logic 114 is configured to open the gate (i.e., G1) corresponds to the communication lane 108A, and close the gate (i.e., G2) corresponds to the communication lane 108B. As a result, the buffer corresponds to the communication lane 108A can receive the number of subframes F1 to Fn, while the buffer corresponds to the communication lane 108B will not receive any subframe.

In an implementation, each subframe that enters to each of the number of buffers 222 will be encoded by an index $T_{kn}$, where k refers to the gate identification (ID) that allows the subframe to enter to each of the number of buffers 222, and n refers to the data frame 212 identification (ID), and the data frame 212 is an integer and may reset and repeat after overflow. For example, a frame F1 corresponds to the communication lane 108A is encoded by an index T11, and a frame F1 corresponds to the communication lane 108B is encoded by an index T21, and similar for subsequent communication lanes.

In another implementation, the number of subframes is represented via a pipe data for each of the communication lanes 108A-108N, where the size of the pipe data is equivalent to frame input of the number of FEC blocks 224, which are configured to encode the received input. For example, if there exists N-number of frame inputs, then the size of pipe data will also be of N-numbers. Moreover, if the pipe data corresponds to the one of the communication lanes 108A-108N is filled, then the subframes are received by the corresponding FEC block. For example, if the pipe data corresponds to the communication lane 108A is filled, then the corresponding subframes are transmitted to the corresponding the FEC block from the number of FEC blocks 224, and similar for subsequent communication lanes. In an implementation, each FEC block from the number of FEC blocks 224 further received an OAM message from the OAM frame 232A, where the OAM message is received from the physical health register 228A through the encode OAM block 230A. Thus, the number of FEC blocks 224 are configured to encode the number of subframes along with the OAM message into its frame. After that, a number of bits are mapped into symbols as a part of line coding. Moreover, an output of each FEC block from the number of FEC blocks 224 is further transmitted to the decode OAM block 234A, as well as to the corresponding transmitter/receiver analog front end from the number of TX/RX-AFE 226.

The output of the decode OAM block 234A is further received by the physical health register 228A. The physical health register 228A is configured to store local and remote physical layers (e.g., the physical layers of the first end 102 as well as the second end 104 of the communication link 106), status (e.g., signal-to-noise-ratio, SNR, bit error rate, BER) of the communication link 106, health of the communication link 106 (or cable health, such as open or short), FEC errors and scrambler and identity of the number of communication lanes 108 which are functional at a time. As shown in FIG. 2A, the physical health register 228A represents the communication lane status of the given communication lane via different symbols. For example, a first symbol, "+" of the physical health register 228A represents that the given communication lane is in good health, and a second symbol, "–" (herein also referred as a second determined status) of the physical health register 228A represents that the given communication lane is not in good health, due to an error in the signal to noise ratio. Moreover, a third symbol, "−−" (herein also referred to as the first determined status) of the physical health register 228A represents that the given communication lane is not in good health due to an error in the signal to noise ratio, the bit error rate, an unknown supply voltage, an unknown local/remote link status, and an unknown loopback mode. Similarly, a fourth symbol, "−−−" of the physical health register 228A represents that the given communication lane is broken (or a lane is turned into a failure).

Thereafter, an output of the physical health register 228A is sent to encode OAM block 230A, which is configured to encode the OAM message with the help of a signal received from the control state machine 236A. In an example, the encode OAM block 230A consists of two types of OAM messages namely, an OAM common message and a lane specific OAM message. In an example, the OAM common message is of a ratio of 2:0, and the OAM common message includes eight (8) different combinations of a common message to notify the number of communication lanes 108A-108N. Similarly, the lane specific OAM message is of a ratio of 8:3, and the lane specific OAM message includes sixty-four (64) different combination of a messages to notify individual communication lane. In addition, the OAM common message is common to all the communication lanes, and the lane specific OAM message, which is specific to one communication lane only.

Moreover, the output of the encode OAM block 230A (i.e., either the OAM common message or the lane specific OAM message) is further sent to the number of FEC blocks 224. In other words, the OAM message is further glued to a FEC frame of the number of FEC blocks 224 during the encoding of the FEC frame at the number of TX/RX-AFE 226, and the process is repeated continuously based on the communication lane status of each of the number of communication lanes 108A-108N. Thereafter, the OAM message and the output of each of the FEC block from the number of FEC blocks 224 is transmitted by the number of TX/RX-AFE 226 from the first end 102 to the second end 104 and through the communication lanes 108A-108N.

Thereafter, the number of subframes (or symbols) are received and processed by the number of TX/RX-AFE 238 of the second end 104. The received subframes are further passed to the corresponding FEC block from the number of FEC blocks 240, which are configured to decode each subframe from the number of subframes. As a result, the FEC data and the OAM message (i.e., either the OAM common message or the lane specific OAM message) are separated. In other words, the OAM message is recovered from the FEC frame, which is beneficial to determine the communication lane status. The OAM message (that includes either the common message or the lane specific message) further goes to the decode OAM block 234B. The output of the decode OAM block 234B is further connected to the physical health register 228B, where bits of the OAM message are stored in their corresponding space within the physical health register 228B (or memory). In other words, the OAM messages (or relevant OAM messages) are interpreted locally after decoding and stored in the physical health register 228B. Further, if needed, necessary actions will be taken based on the OAM message. The physical health registers 228A and 228B are beneficial to regularly communicate to each other about the availability of communication lanes 108A-108N through the OAM message.

In addition, the output of each FEC block of the number of FEC blocks 240 further goes to each pipe data of the corresponding buffer. As a result, each buffer from the number of buffers 222 transmits the number of subframes from the communication interface 110 of the first end 102 to the corresponding buffer of the number of buffers 242 in the other communication interface 112 at the second end 104 with the high-data rate. The output of each of the number of buffers 242 is further passed through the corresponding gate from the number of gates 244, through the multiplexer 246, and finally received by the trans-decoder 248. The trans-decoder 248 is configured to remove the added control signals from the received data. Therefore, a valid data (or the data frame 212) can be decoded correctly at the second end 104 by the trans-decoder 248. The received data is passed to the MAC layer 210B via the medium independent interface layer 214B. In an example, the order of opening the gates 244 at the number of TX/RX-AFE 226 and the number of TX/RX-AFE 238 are to be same as it was done at the first end 102 (i.e., transmitter end).

In accordance with other embodiment, the data to be transmitted over the awake communication lanes is a control message containing a control information to be used for controlling the working of a device located at the second end 104 and connected to the other communication interface 112 at said second end 104. Alternatively stated, the logic 114 initially takes a fixed size of data from the MAC layer 210A. Thereafter, the logic 114 adds first few bits of the control message containing the control information for control purposes. The control message is used to control the device, such as the switch 208, which is located at the second end 104. As the device is connected to the other communication interface 112. Thus, the other communication interface 112 is useful to bring the device into maintenance or repair mode, and also to change the configuration parameters of the device.

In accordance with an embodiment, the logic 114 being further configured, when detecting that the communication lane status for the said awake communication lane has changed to a second determined status. The logic 114 is further configured to change the asleep communication lane into a new awake communication lane and inform the other communication interface 112 at the second end 104 that the new awake communication lane will be used to send data. The logic 114 is further configured to send data to the second end 104 over the awake communication lane and over the new awake communication lane. In an example, if the communication lane 108A is the awake communication lane, and the communication lane 108B is the asleep communication lane. Moreover, if the logic 114 detects that the communication lane status of the communication lane 108A is changed to the second determined status (i.e., an error in signal to noise ratio). Then, the logic 114 is configured to use the communication lane 108A as long as the communication lane status does not degrade below the second determined status. In addition, the logic 114 changes the communication lane 108B into the new awake communication lane. As a result, there exists the awake communication lane (i.e., the communication lane 108A with the second determined status), and the new awake communication lane (i.e., the communication lane 108B in healthy condition). Thereafter, the logic 114 informs the other communication interface 112 at the second end 104 that the communication lane 108B will also be used to send data along with the communication lane 108A. Moreover, the logic 114 sends the data to the second end 104 over the communication lane 108B and also over the communication lane 108A. By virtue of using the awake communication lane as well as the new awake communication lane to send the data from the communication interface 110 to the other communication interface 112, there will be a seamless data transmission. In an example, the logic 114 is further configured to monitor and update the communication lane status for the said awake communication lane to the other communication interface 112.

Therefore, the disclosed communication interface 110 provides seamless data communication between the first end 102 and the second end 104 of the communication link 106, even in case of a lane failure. Additionally, the logic at the communication interface is configured for early detection of the first determined status of a communication lane amongst the said communication lanes 108A-108N and accordingly communicate each of the communication interfaces 110 and 112 at the first end and 102 the second end 104 of the communication link 106 about the communication lane with the first determined status and maintain the data communication seamlessly by use of the other communication lanes. The communication interface 110 at the first end 102 is configured to transmit the data to the other communication interface 112 at the second end 104 with a full data rate and with an improved bandwidth by making all the communication lanes 108A-108N in an operation mode. Moreover, the other communication interface 112 at the second end 104 is configured to transmit the data to the communication interface 110 at the first end with a low data rate, and hence, there is no need to operate all the communication lanes 108A-108N, simultaneously. Instead, merely one communication lane is sufficient to transmit the data from the second end 104, resulting in a reduced power consumption and more energy efficiency. Therefore, one communication lane is used as the awake communication lane, and remaining communication lanes are configured to stay in sleep mode in order to save energy. If the awake communication lane turned in a lane failure, then, one of the communication lanes which are set in sleep mode is changed into the new awake communication lane for data communication. Thus, there will be a seamless as well as asymmetric transmission of data from the communication interface 110 to the other communication interface 112 or vice-versa. Moreover, as long as there exists at least one awake communication lane (i.e., one fault-free communication lane), the transmission of data takes place seamlessly between the first end 102 to the second end 104. By virtue of providing variable data rates, each of the communication interface 110 and the other communication interface 112 can be used in an Institute of Electrical and Electronics Engineers (IEEE) standard namely, IEEE 802.3cy for providing 25/50/100 Gbits/s.

Figure 2B:
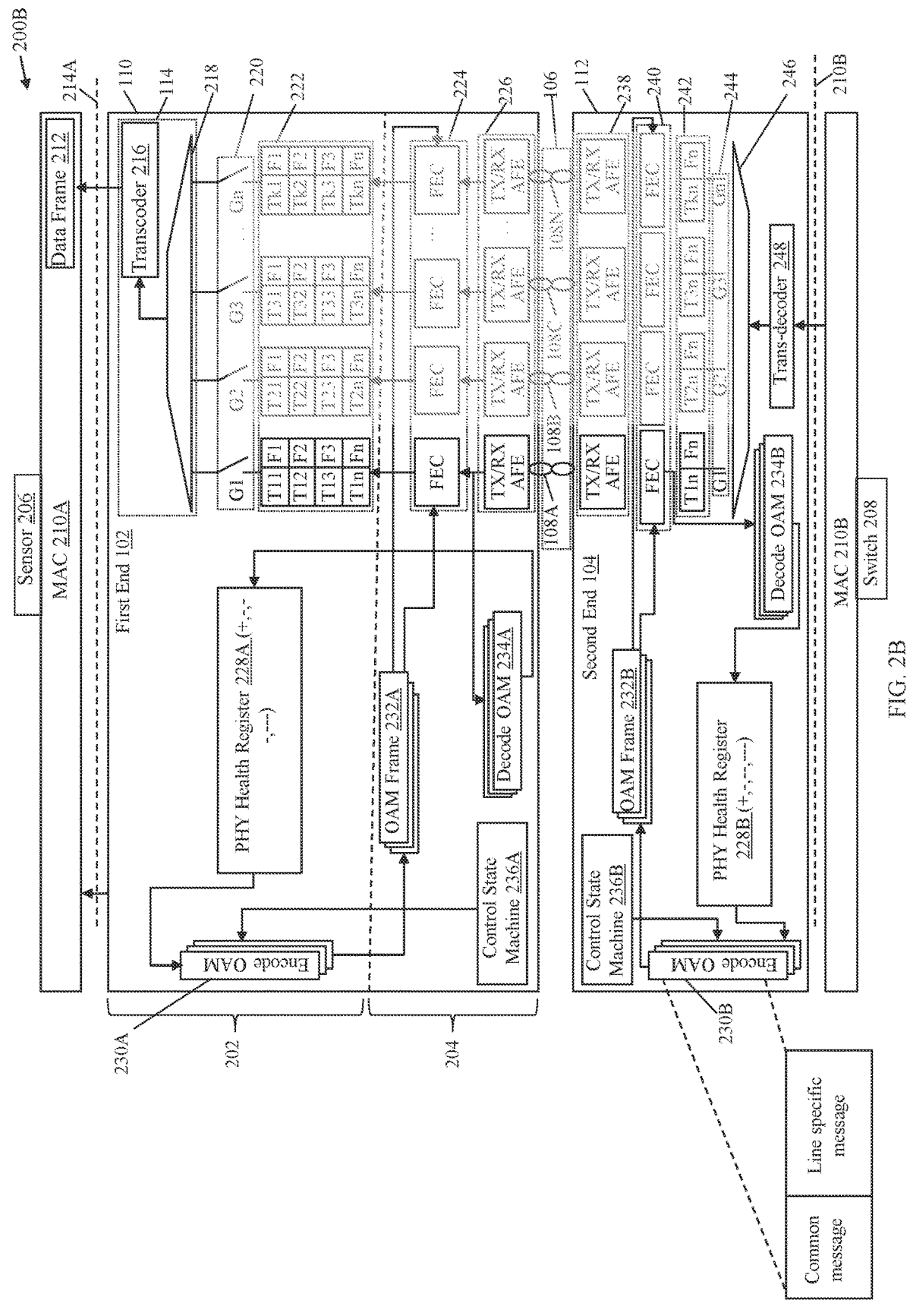
FIG. 2B illustrates communication between various sub-blocks associated with communication interfaces of a second end and a first end, in accordance with another embodiment of the present disclosure.

FIG. 2B illustrates communication between various subblocks associated with communication interfaces of a second end and a first end, in accordance with other embodiment of the present disclosure. FIG. 2B is described in conjunction with elements from FIGS. 1 and 2A. With reference to FIG. 2B, there is shown a circuit architecture 200B that illustrates communication between various subblocks associated with the communication interface 110 of the first node 102A and the other communication interface 112 of the second node 104A of the communication network 100 (of FIG. 1).

As shown in FIG. 2B, the switch 208 is configured to send the data to the sensor 206, which is also referred to as down-link communication of the data. There is shown that the communication lane 108A is the awake communication lane, while the communication lanes 108B-108N are the asleep communication lanes. Therefore, the communication link 106 is useful to send the data from the second end 104 to the first end 102 with a low data rate because there is no need to operate all the communication lanes 108A-108N. Instead, just one communication lane, such as the communication lane 108A is sufficient for data communication, which reduces power consumption and leads to more energy efficiency.

In accordance with another embodiment, the buffer is configured to receive data transmitted over the given communication lane from the corresponding buffer in the other communication interface 112 at the second end 104, and the gate is configured to open or close the output of data received over the given communication lane, the logic 114 being configured to control the gate depending on the communication lane status of the given communication lane. In an implementation, the trans-decoder 248 (acts as a transcoder) receives the data from the MAC layer 210B of the other communication interface 112. Thereafter, the de-multiplexer 260 splits the data frame 212 into the number of subframes, which are further received by the number of buffers 242 and through the number of gates 244. The number of subframes are further received by the number of FEC blocks 240, where the number of FEC blocks 240 further receive an OAM message from the physical health register 228B, through the encode OAM block 230B, and the OAM frame 232B. Moreover, an output of each FEC encoder is further transmitted to the decode OAM block 234A, as well as to the corresponding TX/RX-AFE from the number of TX/RX-AFE 226. Thereafter, the OAM message and the output of the number of FEC blocks 224 is transmitted by the number of TX/RX-AFE 256 from the second end 104 to the first end 102 and through the communication lanes 108A-108N.

Thereafter, the number of subframes (or symbols) are received and processed by the number of TX/RX-AFE 226 of the first end 102. Moreover, the received subframes are further passed to the corresponding FEC block from the number of FEC blocks 224, which are configured to decode each subframe of the number of subframes. As a result, the FEC data and the OAM message are separated (or the OAM message is recovered from the FEC frame). In addition, the OAM message further goes to the decode OAM block 234A, and the output of the decode OAM block 234A is further connected to the physical health register 228A, where bits of the OAM message is stored in their corresponding space in the physical health register 228A (or memory).

In addition, the output of each FEC block from the number of FEC blocks 224 further goes to each pipe data of the corresponding buffer from the number of buffers 222. The output of each buffer is further passed through the number of gates 220, where the number of gates 220 are further controlled by the logic 114 based on the communication lane status of each communication lane 108A-108N. For example, if the communication lane status shows that only the communication lane 108A is the awake communication lane, and the communication lanes 108B-108N are the asleep communication lane. Then, the logic 114 is configured to open the gate (i.e., G1) corresponding to the communication lane 108A, and closes the gate (i.e., G2) corresponding to the communication lanes 108B-108N. As a result, only the buffer corresponds to the communication lane 108A can send the number of subframes to the de-multiplexer 218, while the buffers corresponding to the communication lanes 108B-108N will not be able to transmit the number of subframes to the de-multiplexer 218. Thereafter, the number of subframes are finally received by the transcoder 216 (acts as a trans-decoder), which is configured to remove added control signals from the received number of subframes (or data). Further, the received data in the form of the number of subframes is passed to the MAC layer 210A via the medium independent interface layer 214A.

Figure 2C:
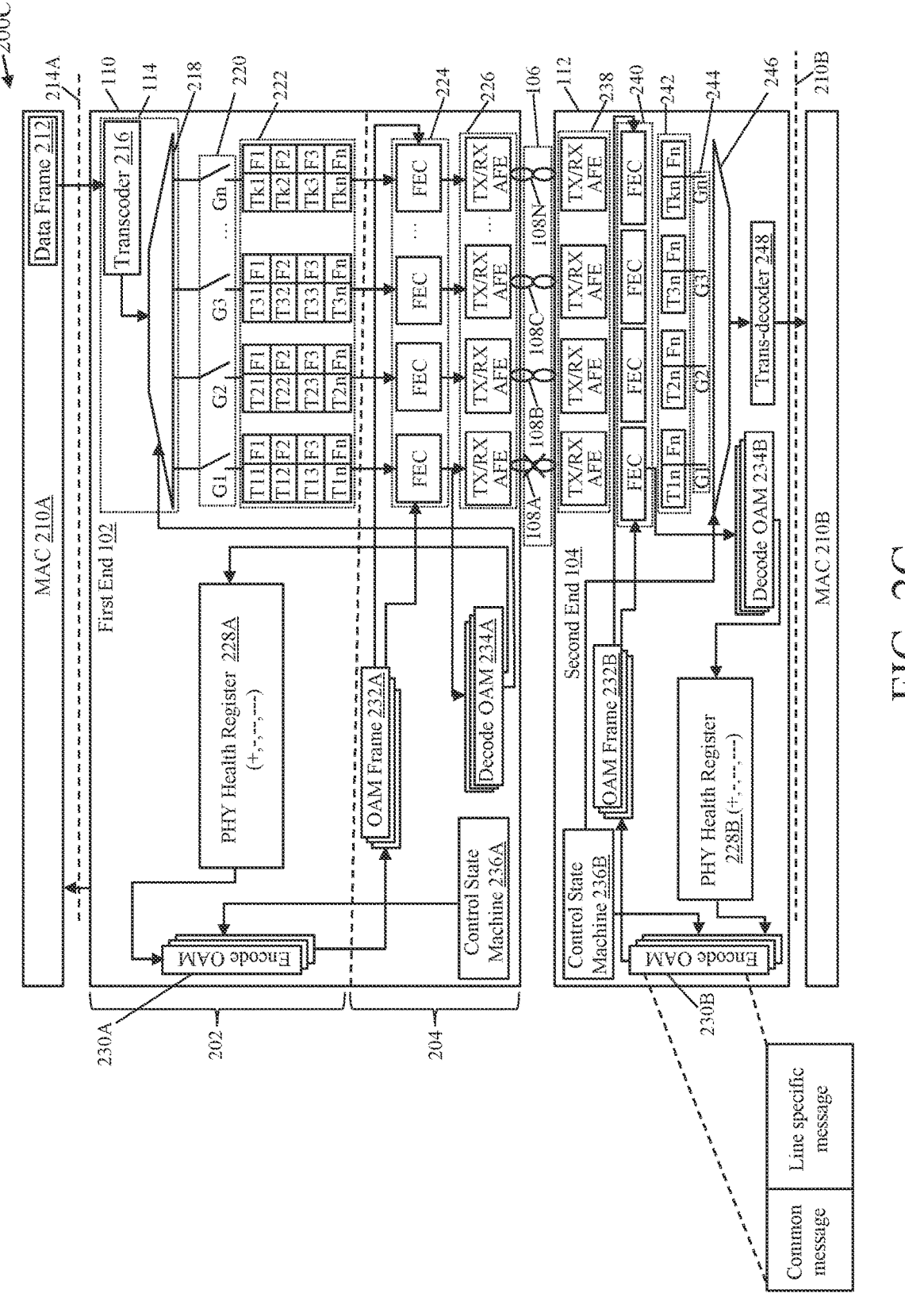
FIG. 2C illustrates communication between various sub-blocks associated with communication interfaces of a first end and a second end, in accordance with yet another embodiment of the present disclosure.

FIG. 2C illustrates communication between various sub-blocks associated with communication interfaces of a first end and a second end, in accordance with other embodiment of the present disclosure. FIG. 2C is described in conjunction with elements from FIGS. 1, 2A, and 2B. With reference to FIG. 2C, there is shown a circuit architecture 200C that illustrates communication between various sub-blocks associated with the communication interface 110 of the first node 102A and the other communication interface 112 of the second node 104A of the communication network 100 (of FIG. 1).

In the circuit architecture 200C, initially, the number of communication lanes 108B-108N are in a healthy state, due to which the sensor 206 can send the data to the switch 208 at high (or full) data rate. Thereafter, the logic 114 detects that the communication lane status of the communication lane 108A is changed from a healthy state (i.e., from '+') to the first determined status (i.e., '--'), which represents that the communication lane 108A is not in good health. After some time, the communication lane status of the communication lane 108A is changed from the first determined status (i.e., '--') to the failure of the communication lane 108A (i.e., '---'), due to which the communication lane 108A will not be able to send the data, as shown in FIG. 2C by a crossed mark on the communication lane 108A. Then, a message is shared firstly and acknowledged between the communication link 106 partners. For example, a "common message" field of OAM message is shared firstly and acknowledged between the communication interface 110 and the other communication interface 112. Moreover, when the communication interface 110 and the other communication interface 112 aggress that there exists the first determined status in the communication lane 108A, and the corresponding gate (e.g., G1) need to be closed at the communication interface 110 and also at the other communication interface 112. Immediately, both the MAC layer 210A and 210B are notified via corresponding medium independent interface layers 214A and 214B that the capacity of the communication link 106 will be lowered from the sensor 206 to the switch 208.

Thereafter, the data received from the MAC layer 210A starts to fill the number of buffers 222 (or the pipe data) starting from a second gate (i.e., G2) till Nth gate (i.e., Gn) and repeats again. Since only the communication lane 108A has the first determined status, thus, the transcoder 216 provides the number of subframes that fits to the remaining buffers that are still in operation, such as the buffers that correspond to the communication lanes 108B-108N. In the transcoder 216 a space that corresponds to the gate of the communication lane 108A (i.e., G1)), which is currently not functioning will be filled with a dummy data, and later that dummy data will be just ignored. This further leads a correct decoding at a receiver (or the other communication interface 112). In other words, a valid data can be decoded correctly at the other communication interface 112 of the second end 104. In this way, as long as there is a fault in one communication lane, free communication takes place seamlessly between both ends (i.e., the first end 102 and the second end 104) of the communication link 106 with a partially reduced speed. In an example, during the data transmission from the second end 104 to the first end 102, all control, as well as the OAM message, are communicated via the communication lane 108B.

In another implementation, despite the failure of the communication lane 108A, the logic 114 regularly checks the health of the communication lane 108A (e.g., via the control state machine 236A). In case, the health of the communication lane 108A turns from the first determined status (i.e., from ('−−') or from the lane failure) to the healthy state (i.e., +). Then, the logic 114 is configured to open the said awake communication lane (e.g., the communication lane 108A) as well as the corresponding gate (e.g., G1). As a result, there exists a seamless communication from the sensor 206 to the switch 208.

Figure 3:
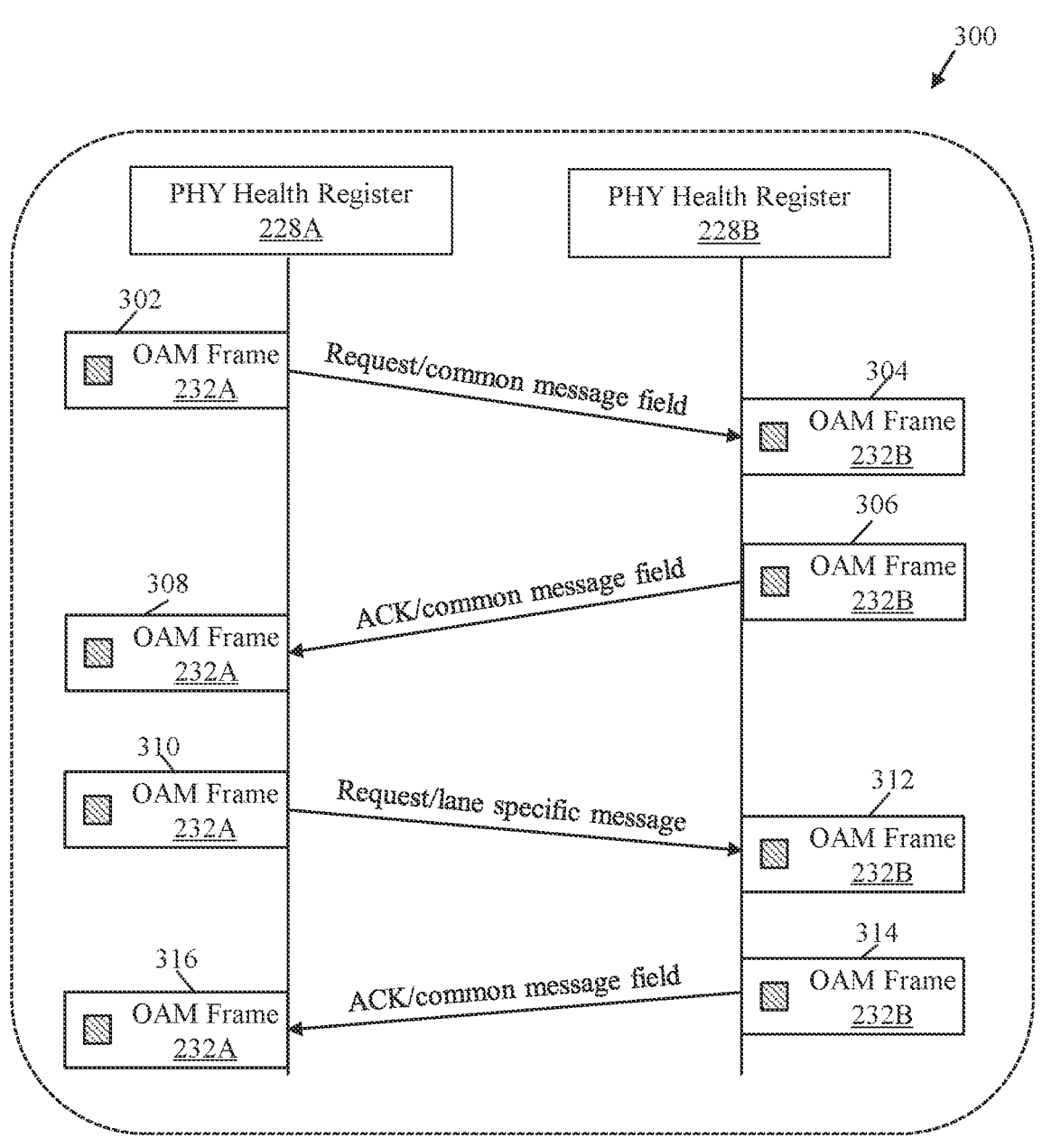
FIG. 3 is a sequence diagram that depicts an interaction process between two physical health registers, in accordance with an embodiment of the present disclosure.

FIG. 3 is a sequence diagram that depicts an interaction process between two physical health registers, in accordance with an embodiment of the present disclosure. FIG. 3 is described in conjunction with elements from FIGS. 1, 2A, 2B, and 2C. With reference to FIG. 3, there is shown a sequence diagram 300 that depicts an interaction process between the two physical health registers, such as the physical health register 228A of the communication interface 110 and the physical health register 228B of the other communication interface 112. The sequence diagram 300 includes operations 302 to 316.

At operation 302, the physical health register 228A detects that a communication lane status for an awake communication lane has changed to a first determined status at the first end 102. For example, the physical health register 228A of the first end 102 detects that the communication lane status for the communication lane 108A has changed to the first determined status. Thereafter, the physical health register 228A notifies the MAC layer 210A of the first end 102 and closes the awake communication lane (i.e., the communication lane 108A) as well as the corresponding gate (e.g., G1). The physical health register 228A further notifies and requests the physical health register 228B to close the awake communication lane (i.e., the communication lane 108A) as well as the corresponding gate (i.e., G1) at the second end 104. In an example, the physical health register 228A of the first end 102 notifies and requests the physical health register 228B of the second end 104 via a common message field (CMF) of the OAM message, and through the OAM frame 232A, where the number of communication lanes 108A-108N sends same common message field (CMF). In an example, the physical health register 228B also determines a new speed and a new functioning communication lane.

At operation 304, the physical health register 228B receives and decodes the received common message field (CMF) of the OAM message through the OAM frame 232B.

At operation 306, the physical health register 228B receives and reads the common message field (CMF) of the OAM message through the OAM frame 232B. Thereafter, the physical health register 228B executes the received message. The physical health register 228B further notifies the MAC layer 210B and closes the said awake communication lane (i.e., the communication lane 108A) with the first determined status as well as the corresponding gate (i.e., G1). After that, the physical health register 228B share an acknowledgment message to the physical health register 228A via the common message field of the OAM message. Moreover, the physical health register 228B starts decoding data accordingly.

At operation 308, the physical health register 228A receives the acknowledgment message from the physical health register 228B, where the acknowledgment message confirms that the physical health register 228B closed the awake communication lane (e.g., the communication lane 108A) with the first determined status as well as the corresponding gate (e.g., G1).

At operation 310, despite of the failure of the communication lane 108A, the logic 114 regularly checks the health of the communication lane 108A (e.g., via the control state machine 236A). Moreover, the physical health register 228A determines that the communication lane status of the said awake communication lane (e.g., the communication lane 108A) is now in a healthy state. In other words, the health of the communication lane 108A turns from the first determined status (i.e., from '−−') in the physical health register 228A) to the healthy state (i.e., '+' in the physical health register 228A). Then, the physical health register 228A requests the physical health register 228B to open the said awake communication lane (e.g., the communication lane 108A) as well as the corresponding gate (e.g., G1). In an example, the physical health register 228A notifies and requests the physical health register 228B via a lane specific field (LSF) message of the OAM message and through the OAM frame 232A.

At operation 312, the physical health register 228B receives and decodes the received lane specific field message of the OAM message through the OAM frame 232B.

At operation 314, the physical health register 228B receives and reads the lane specific field message of the OAM message through the OAM frame 232B. Thereafter, the physical health register 228B executes the received lane specific field message. The physical health register 228B further notifies the MAC layer 210B and opens the said awake communication lane (i.e., the communication lane 108A) as well as the corresponding gate (i.e., $G_1$). After that, the physical health register 228B shares another acknowledgment message to the physical health register 228A via the common message field of the OAM message.

At operation 316, the physical health register 228A receives the other acknowledgment message from the physical health register 228B, where the other acknowledgment message confirms that the physical health register 228B opened the awake communication lane (e.g., the communication lane 108A) as well as the corresponding gate (e.g., G1). The physical health register 228A further notifies the MAC layer 210A and opens the said awake communication lane (i.e., the communication lane 108A) as well as the corresponding gate (i.e., G1). As a result, there exists a seamless data communication through all the communication lanes 108A-108N.

FIG. 4 is a flowchart of a method of communication over a communication link comprising a number of communication lanes, in accordance with an embodiment of the present disclosure. FIG. 4 is described in conjunction with elements from FIGS. 1, 2A, 2B, 2C and 3. With reference to FIG. 4, there is shown a method 400 of communication over the communication link 106 comprising the number of communication lanes 108A-108N. The method 400 includes steps 402 to 412. The method 400 is executed by the communication interface 110 at the first end 102 of the communication link 106 and the other communication interface 112 at the second end 104 of the communication link 106.

In other aspect, the present disclosure provides a method 400 of communication over a communication link 106 comprising a number of communication lanes 108A-108N greater or equal to two and having a first end 102 and a second end 104, the method 400 comprising sending data from the first end 102 to second end 104 over one awake communication lane amongst the said communication lanes 108A-108N, at least one asleep communication lane amongst the said communication lanes being in a sleep mode in which it cannot send any data. In other words, the method 400 comprises sending the data over one awake communication lane amongst the said communication lanes 108A-108N, and from the first end 102 to second end 104, and vice versa. In an implementation, the first end 102 of the communication link 106 is configured to receive the data from the plurality of sensors. Thereafter, the data is received by the logic 114 of the communication interface 110 at the first end 102 of the communication link 106. The logic 114 is configured to cooperate with the other communication interface 112 so that the logic 114 can send the data to the second end 104 and over the one awake communication lane amongst the said communication lanes 108A-108N. As the communication link 106 includes one awake communication lane. Thus, there will be a seamless transmission of data from the communication interface 110 to the other communication interface 112. The communication link 106 is beneficial to send the data from the first end 102 to the second end 104 with a full data rate and with an improved bandwidth. As the at least one asleep communication lane is in the sleep mode (i.e., which cannot send any data). Therefore, the communication link 106 can also send the data from the second end 104 to the first end 102 with a low data rate because there is no need to operate all the communication lanes 108A-108N. Instead, just one communication lane is sufficient, which further reduces power consumption.

At step 402, the method 400 comprises storing, at the first end 102, a communication lane status for the said awake communication lane. In an example, the communication lane 108A is configured to act as an awake communication lane (or active), and the communication lanes 108B-108N are configured to act as asleep communication lanes (or inactive). Moreover, the method 400 comprises storing by the logic 114, the communication lane status for the said awake communication lane, such as communication lane 108A. In an example, the communication lane status corresponds to communication lane health and availability of the awake communication lane. The communication lane status is beneficial for detecting a change in the said awake communication lane.

At step 404, the method 400 comprises detecting, at the first end 102, that the communication lane status for the said awake communication lane has changed to a first determined status, and when detecting, at the first end 102, that the communication lane status for the said awake communication lane has changed to the first determined status. In other words, if the communication lane status for the said awake communication lane (e.g., the communication lane 108A) is changed to the first determined status. Then, the first determined status will be detected by the logic 114. Therefore, the logic 114 of the communication interface 110 is beneficial for early detection of the first determined status (or lane failure).

At step 406, the method 400 comprises stopping sending data over the awake communication lane. In other words, if the communication lane status for the said awake communication lane (e.g., the communication lane 108A) is changed to the first determined status. Then, the logic 114 of the communication interface 110 is configured to not to send the data over the communication lane 108A.

At step 408, the method 400 comprises changing the asleep communication lane into a new awake communication lane. For example, the logic 114 is configured to change the communication lane 108B from asleep communication lane to the new awake communication lane. The new awake communication lane is useful to provide the seamless data transmission from the communication interface 110 to the other communication interface 112.

At step 410, the method 400 comprises informing the other communication interface 112 at the second end 104 that the new awake communication lane will be used to send data. In other words, the logic 114 is configured to inform the other communication interface 112 that the communication lane 108B will be used to send data from the communication interface 110 to the other communication interface 112

At step 412, the method 400 comprises sending data to the second end 104 over the new awake communication lane. In other words, if both the communication interface 110 and the other communication interface 112 agree that the communication lane status for the said awake communication lane has changed to the first determined status (i.e., there is a fault in communication lane 108A). Then, the logic 114 is configured for sending the data to the second end 104 over the new awake communication lane, such as over the communication lane 108B.

In accordance with yet other embodiment, the method 400 further comprising splitting, at the first end 102, a data frame 212 into a number of subframes corresponding to the number of awake communication lanes, the data to be transmitted over the awake communication lanes being one of the said subframes. In an implementation, the method 400 comprises receiving the data in the form of the data frame 212 from a sensor that is arranged near the first end 102 of the communication link 106. Thereafter, the method 400 comprises splitting, at the first end 102, the data frame 212 into the number of subframes corresponding to the number of awake communication lanes. In an implementation, the logic 114 is configured to split the data frame 212 into the number of subframes. Thereafter, the awake communication lane is configured to transmit the number of subframes, such as from the communication interface 110 to the other communication interface 112 and through the communication link 106. By virtue of using the number of subframes, an overall bandwidth required for the communication link 106 is improved.

In accordance with an embodiment, the method 400 further comprises, for each given communication lane amongst all the awake communication lanes and all the asleep communication lanes, inputting, in a buffer at the first end 102, data to be transmitted, over the given communication lane, to a corresponding buffer at the second end. The method 400 further comprises controlling a gate at the first end to open or close the input in the buffer of data to be transmitted over the given communication lane, to the corresponding buffer at the second end 104, depending on the communication lane status of the given communication lane. In an implementation, the transcoder 216 at the first end 102 receives the data frame 212 from the MAC layer 210A, where the data frame 212 includes a fixed size of data. Thereafter, the de-multiplexer 218 of the logic 114 is configured to split the data frame into the number of subframes, which are further received by the number of buffers 222 through the number of gates 220. The number of gates 220 are further controlled by the logic 114 based on the communication lane status of each communication lane 108A-108N. For example, if the communication lane status shows that only the communication lane 108A is the awake communication lane, and the communication lane 108B is the asleep communication lane. Then, the logic 114 is configured to open the gate (i.e., G1) corresponds to the communication lane 108A, and close the gate (i.e., G2) corresponds to the communication lane 108B. As a result, the buffer corresponds to the communication lane 108A can receive the number of data frames, while the buffer corresponds to the communication lane 108B will not receive any data frame. Thereafter, the buffer corresponds to the communication lane 108A receives the frames F1 to Fn, and similar for subsequent awake communication lanes.

Therefore, depending on the communication lane status of the given communication lane, the data in the form of the number of subframes is transmitted from the first end 102 to the second end 104 and through the communication lanes 108A-108. The number of subframes (or symbols) are further received and processed at the second end 104. As a result, each buffer of the number of buffers 222 transmits the number of subframes from the communication interface 110 of the first end 102 to the corresponding buffer of the number of buffers 242 at the other communication interface 112 at the second end 104. Thereafter, a valid data is decoded correctly at the second end 104 (e.g., by the trans-decoder 248), and the received data is passed to the MAC layer 210B via medium independent interface layer 214B. In an example, the order of opening the number of gates 244 at the number of TX/RX-AFE 226 and the number of TX/RX-AFE 238 are to be same as it was done at the first end 102 (i.e., transmitter end). Beneficially, as long as there is one awake communication lane (i.e., fault-free communication lane), the communication of the data takes place seamlessly between the communication link 106 partners with reduced speed, such as between the communication interface 110 and the other communication interface 112.

In accordance with other embodiment, the communication interface 110 further comprising receiving in the buffer at the first end 102, data transmitted over the given communication lane from the corresponding buffer at the second end 104, and controlling the gate at the first end 102 to open or close the output of data received over the given communication lane, depending on the communication lane status of the given communication lane. In an implementation, the data in the form of the number of subframes is transmitted from the second end 104 to the first end 102 and through the communication lanes 108A-108N. Thereafter, the number of subframes (or symbols) are received and processed at the first end 102 and sent to each pipe data of the corresponding buffer from the number of buffers 222. The output of each buffer from the number of buffers 222 is further passed through the number of gates 220, where the number of gates 220 are controlled by the logic 114 based on the communication lane status of each communication lane 108A-108N. For example, if the communication lane status shows that only the communication lane 108A is the awake communication lane, and the communication lane 108B is the asleep communication lane. Then, the logic 114 is configured to open the gate (i.e., G1) corresponds to the communication lane 108A, and close the gate (i.e., G2) corresponds to the communication lane 108B. As a result, a valid data can be decoded correctly at the first end 102. The received the data is further passed to the MAC layer 210A via the medium independent interface layer 214A.

In accordance with other embodiment, the data to be transmitted over the awake communication lanes is a control message containing a control information to be used for controlling the working of a device located at the second end 104 and connected to the other communication interface 112 at said second end 104. Alternatively stated, the logic 114 (e.g., a transcoder) initially takes the fixed size of data from the MAC layer 210A. Thereafter, the logic 114 adds the first few bits of the control message containing the control information for control purposes. The control message is beneficial to control the device, such as the switch 208, which is located at the second end 104. As the device is connected to the other communication interface 112. Thus, the other communication interface 112 is useful to bring the device into maintenance or repair mode, and also to change the configuration parameters of the device.

In accordance with yet other embodiment, the method 400 further comprises detecting, at the first end 102, that the communication lane status for the said awake communication lane has changed to a second determined status, and when detecting, at the first end 102, that the communication lane status for the said awake communication lane has changed to the second determined status. The method 400 further comprises changing the asleep communication lane into a new awake communication lane, and informing the communication interface at the second end that the new awake communication lane will be used to send data. The method 400 further comprises sending data to the second end over the awake communication lane and over the new awake communication lane. In an example, if the communication lane 108A is the awake communication lane, and the communication lane 108B is the asleep communication lane. Moreover, the method 400 comprises detecting that the communication lane status for the communication lane 108A has changed to the second determined status. Then, the method 400 further comprises using the communication lane 108A as long as the communication lane status does not degrade below the second determined status. The method 400 further comprises changing the communication lane 108B into the new awake communication lane. As a result, there exists the awake communication lane (i.e., the communication lane 108A with the second determined status), and the new awake communication lane (i.e., the communication lane 108B in healthy condition). Thereafter, the method 400 further comprises, informing the other communication interface 112 at the second end 104 that the communication lane 108B will be used to send data along with the communication lane 108A. Moreover, the method 400 further comprises sending the data to the second end 104 over the communication lane 108B along and also over the communication lane 108A. Thus, the method 400 is beneficial to provide seamless data transmission from the communication interface 110 to the other communication interface 112.

In other aspect, the present disclosure provides a computer program product comprising program code for performing the method 400, when executed by a processor in a computer system. In an example, the program code is implemented on a non-transitory computer-readable storage medium which include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. In an example, the program code is generated by the computer program product, which is implemented in view of the method 400, and for use in implementing the method 400 on the computer system.

Therefore, the disclosed method 400 provides seamless data communication between the first end 102 and the second end 104 of the communication link 106, even in case of a lane failure. Additionally, the method 400 is configured for early detection of the first determined status of a communication lane amongst the said communication lanes 108A-108N. The method 400 further communicate each of the communication interfaces 110 and 112 at the first end and 102 the second end 104 of the communication link 106 about the communication lane with the first determined status and maintain the data communication seamlessly by use of the other communication lanes. The method 400 is beneficial to transmit the data from the communication interface 110 at the first end 102 to the other communication interface 112 at the second end 104 with a full data rate and with an improved bandwidth by making all the communication lanes 108A-108N in an operation mode. Moreover, the method 400 is also beneficial to transmit the data from the other communication interface 112 at the second end 104 to the communication interface 110 at the first end 102 with a low data rate, and hence, there is no need to operate all the communication lanes 108A-108N, simultaneously. Instead, merely one communication lane is sufficient to transmit the data from the second end 104, resulting in a reduced power consumption and more energy efficiency. Therefore, one communication lane is used as the awake communication lane, and the remaining communication lanes are configured to stay in sleep mode in order to save energy. If the awake communication lane turned in a lane failure, then, one of the communication lanes which are set in sleep mode is changed into the new awake communication lane for data communication. Thus, there will be a seamless as well as asymmetric transmission of data from the communication interface 110 to the other communication interface 112 and vice-versa. Moreover, as long as there exists at least one awake communication lane (i.e., one fault-free communication lane), the transmission of data takes place seamlessly between the first end 102 to the second end 104.

The steps 402 and 412 are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A communication interface for use at a first end of a communication link comprising a number of communication lanes greater or equal to two, the communication interface comprising a buffer, a gate, and a processor, the processor configured to:

cooperate with another communication interface at a second end of the communication link to send data to the second end over one awake communication lane amongst the communication lanes, and to not sent data over at least one asleep communication lane amongst the communication lanes being in a sleep mode store a communication lane status for the awake communication lane; and upon detecting that the communication lane status for the awake communication lane has changed to a first determined status:

stop sending data over the awake communication lane;

change the asleep communication lane into a new awake communication lane;

inform the communication interface at the second end that the new awake communication lane will be used to send data; and send data to the second end over the new awake communication lane wherein, for each given communication lane amongst all awake communication lanes and all asleep communication lanes, the buffer is configured to receive data to be transmitted, over the given communication lane, to a corresponding buffer in the other communication interface at the second end, and the gate is configured to open or close an input in the buffer of the data to be transmitted over the given communication lane, to the corresponding buffer in the other communication interface at the second end, and control the gate depending on the communication lane status of the given communication lane.

2. The communication interface according to claim 1, wherein the buffer is further configured to receive data transmitted over the given communication lane from the corresponding buffer in the other communication interface at the second end, the gate is further configured to open or close an output in the buffer of the data received over the given communication lane.

3. The communication interface according to claim 1, further configured to split a data frame into a number of subframes corresponding to a number of awake communication lanes, the data to be transmitted over the awake communication lanes being one of the number of subframes.

4. The communication interface according to claim 1, wherein the data to be transmitted over the awake communication lanes is a control message containing a control information to be used for controlling a working of a device located at the second end and connected to the other communication interface at the second end.

5. The communication interface according to claim 1, further configured to, upon detecting that the communication lane status for the awake communication lane has changed to a second determined status:

change the asleep communication lane into a new awake communication lane;

inform the other communication interface at the second end that the new awake communication lane will be used to send data; and send data to the second end over the awake communication lane and over the new awake communication lane.

6. A communication network comprising a first node at the first end of the communication link and a second node at the second end of the communication link, the first node and the second node each comprising a respective communication interface configured according to the communication interface of claim 1.

7. The communication network according to claim 6, the communication network being an in-vehicle communication network.

8. A method of communication over a communication link comprising a number of communication lanes greater or equal to two, and having a first end and a second end, the method comprising:

sending data from the first end to second end over one awake communication lane amongst the communication lanes, and not sending data over at least one asleep communication lane amongst the said communication lanes being in a sleep mode;

storing, at the first end, a communication lane status for the awake communication lane; and detecting, at the first end, that the communication lane status for the awake communication lane has changed to a first determined status, and upon detecting, at the first end, that the communication lane status for the said awake communication lane has changed to the determined status:

stopping sending data over the awake communication lane;

changing the asleep communication lane into a new awake communication lane;

informing another communication interface at the second end that the new awake communication lane will be used to send data; and sending data to the second end over the new awake communication lane; and for each given communication lane amongst all awake communication lanes and all asleep communication lanes, inputting, in a buffer at the first end, data to be transmitted, over the given communication lane, to a corresponding buffer at the second end, and controlling a gate at the first end to open or close an input in the buffer of the data to be transmitted over the given communication lane, to the corresponding buffer at the second end, depending on the communication lane status of the given communication lane.

9. The method according to claim 8, further comprising receiving in the buffer at the first end, the data transmitted over the given communication lane from the corresponding buffer at the second end, and controlling the gate at the first end to open or close an output in the buffer of the data received over the given communication lane, depending on the communication lane status of the given communication lane.

10. The method according to claim 8, further comprising splitting, at the first end, a data frame into a number of subframes corresponding to a number of awake communication lanes, the data to be transmitted over the awake communication lanes being one of the subframes.

11. The method according to claim 8, wherein the data to be transmitted over the awake communication lanes is a control message containing a control information to be used for controlling a working of a device located at the second end and connected to the other communication interface at said second end.

12. The method according to claim 8, further comprising detecting, at the first end, that the communication lane status for the awake communication lane has changed to a second determined status, and upon detecting, at the first end, that the communication lane status for the awake communication lane has changed to the second determined status:

changing the asleep communication lane into a new awake communication lane;

informing the other communication interface at the second end that the new awake communication lane will be used to send data; and sending data to the second end over the awake communication lane and over the new awake communication lane.

13. A non-transitory computer-readable storage medium storing program code, which upon being executed by one or more processors, provide for performance of a method of communication over a communication link comprising a number of communication lanes greater or equal to two, and having a first end and a second end, the method comprising:

sending data from the first end to second end over one awake communication lane amongst the communication lanes, and not sending data over at least one asleep communication lane amongst the said communication lanes being in a sleep mode;

storing, at the first end, a communication lane status for the awake communication lane; and detecting, at the first end, that the communication lane status for the awake communication lane has changed to a first determined status, and upon detecting, at the first end, that the communication lane status for the said awake communication lane has changed to the determined status:

stopping sending data over the awake communication lane;

changing the asleep communication lane into a new awake communication lane;

informing another communication interface at the second end that the new awake communication lane will be used to send data; and sending data to the second end over the new awake communication lane; and for each given communication lane amongst all awake communication lanes and all asleep communication lanes, inputting, in a buffer at the first end, data to be transmitted, over the given communication lane, to a corresponding buffer at the second end, and controlling a gate at the first end to open or close an input in the buffer of the data to be transmitted over the given communication lane, to the corresponding buffer at the second end, depending on the communication lane status of the given communication lane.

14. The non-transitory computer-readable storage medium according to claim 13, further storing instructions for receiving in the buffer at the first end, the data transmitted over the given communication lane from the corresponding buffer at the second end, and controlling the gate at the first end to open or close an output in the buffer of the data received over the given communication lane, depending on the communication lane status of the given communication lane.

15. The non-transitory computer-readable storage medium according to claim 13, further storing instructions for splitting, at the first end, a data frame into a number of subframes corresponding to a number of awake communication lanes, the data to be transmitted over the awake communication lanes being one of the subframes.

16. The non-transitory computer-readable storage medium according to claim 13, wherein the data to be transmitted over the awake communication lanes is a control message containing a control information to be used for controlling a working of a device located at the second end and connected to the other communication interface at said second end.

17. The non-transitory computer-readable storage medium according to claim 13, further storing instructions for detecting, at the first end, that the communication lane status for the awake communication lane has changed to a second determined status, and upon detecting, at the first end, that the communication lane status for the awake communication lane has changed to the second determined status:

changing the asleep communication lane into a new awake communication lane;

informing the other communication interface at the second end that the new awake communication lane will be used to send data; and sending data to the second end over the awake communication lane and over the new awake communication lane.

\* \* \* \* \*